(12) United States Patent
Zevulun et al.

(10) Patent No.: US 12,131,132 B2
(45) Date of Patent: Oct. 29, 2024

(54) EFFICIENT MONTGOMERY MULTIPLIER

(71) Applicant: MELLANOX TECHNOLOGIES, LTD., Yokneam (IL)

(72) Inventors: Adir Zevulun, Beer Sheva (IL); Uria Basher, Ganei Tal (IL); Nir Shmuel, Bet Shemesh (IL); Ben Witulski, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 832 days.

(21) Appl. No.: 17/180,993

(22) Filed: Feb. 22, 2021

(65) Prior Publication Data
US 2022/0269487 A1    Aug. 25, 2022

(51) Int. Cl.
    *G06F 7/72*    (2006.01)
(52) U.S. Cl.
    CPC .................................. *G06F 7/728* (2013.01)
(58) Field of Classification Search
    CPC ............. G06F 7/72; G06F 7/724; G06F 7/728
    See application file for complete search history.

(56) References Cited

U.S. PATENT DOCUMENTS

| | | | |
|---|---|---|---|
| 6,748,410 B1 | 6/2004 | Gressel et al. | |
| 8,433,736 B2 | 4/2013 | Huang et al. | |
| 8,532,286 B2 | 9/2013 | Lambert | |
| 9,851,948 B2 | 12/2017 | Lu et al. | |
| 2006/0008080 A1* | 1/2006 | Higashi | G06F 7/728 380/28 |
| 2006/0059220 A1* | 3/2006 | Koshy | G06F 7/728 708/491 |
| 2008/0109501 A1 | 5/2008 | Douguet et al. | |

OTHER PUBLICATIONS

S-R. Kuang et al, Low-Cost High-Performance VLSI Architecture for Montgomery Modular Multiplication, IEEE Transactions on Very Large Scale Integration (VLSI) Systems, vol. 24, No. 2, 2016 (Year: 2016).*
P. Mahapatra et al., RSA Cryptosystem with Modified Montgomery Modular Multiplier, IEEE 2017 (Year: 2017).*
D. Monica et al., High-Throughput VLSI Architecture for Montgomery Modular Multiplication Algorithm by using PASTA, International Journal of Scientific Engineering and Technology Research, 2017 (Year: 2017).*

(Continued)

*Primary Examiner* — Emily E Larocque
(74) *Attorney, Agent, or Firm* — MEITAR PATENTS LTD.

(57) ABSTRACT

An Integrated Montgomery Calculation Engine (IMCE), for multiplying two multiplicands modulo a predefined number, includes a Carry Save Adder (CSA) circuit and control circuitry. The CSA circuit has multiple inputs, and has outputs including a sum output and a carry output. The control circuitry is coupled to the inputs and the outputs of the CSA circuit and is configured to operate the CSA circuit in at least (i) a first setting that calculates a Montgomery precompute value and (ii) a second setting that calculates a Montgomery multiplication of the two multiplicands.

14 Claims, 6 Drawing Sheets

(56) References Cited

OTHER PUBLICATIONS

D. J. Anitha et al., High Speed Low Cost New Semi Carry Save Adder Montgomery Modular Multiplier, International Journal of Scientific Engineering and Technology Research, 2016 (Year: 2016).*
Koc et al., "Analyzing and comparing Montgomery Multiplication Algorithms," IEEE Micro, vol. 16, No. 3, pp. 26-33, Jun. 1996.
McIvor et al., "Modified Montgomery Modular Multiplication and RSA Exponentiation Techniques," IEE Proceedings: Computer & Digital Techniques, vol. 151, No. 6, pp. 402-408, Nov. 2004.
Thampi et al., "Montgomery Multiplier for Faster Cryptosystems," ScieneDirect, Procedia Technology, vol. 25, pp. 392-398, year 2016.
Walter, "Montgomery Exponentiation needs no final Subtractions," Electronics Letters, vol. 35, No. 21, pp. 1831-1832, Oct. 1999.
Kenezevic et al., "Speeding up Barrett and Montgomery Modular Multiplications," pp. 1-11, year 2009 downloaded from http://homes.esat.kuleuven.be/~fvercaut/papers/bar_mont.pdf.
Zevulun et al., U.S. Appl. No. 17/180,999, filed Feb. 22, 2021.
Thejaswini et al., "Design of Modified Modular Multiplies for RSA Cryptosystems," International Journal of Scientific Engineering and Technology Research, vol. 04, issue 12, pp. 2253-2257, May 2015.
U.S. Appl. No. 17/180,999 Office Action dated Jan. 9, 2024.

* cited by examiner

EFFICIENT MONTGOMERY MULTIPLIER

CROSS-REFERENCE TO RELATED APPLICATIONS

This application is related to a U.S. Patent Application entitled "Fast Precomputation for Montgomery Multiplier,", filed on even date, whose disclosure is incorporated herein by reference.

FIELD OF THE INVENTION

The present invention relates generally to Montgomery arithmetic, and particularly to calculation of Montgomery precompute values and implementation of Montgomery multipliers and associated circuitry.

BACKGROUND OF THE INVENTION

In cryptography, operations such as modulo multiplication and exponentiation of large integers are widely used. Several methods for fast implementation of such multiplications and exponentiations have been proposed. One such method which is widely used was proposed by Peter Lawrence Montgomery in 1985, and is described, for example, by Kork et al., in "Analyzing and Comparing Montgomery Multiplication Algorithms," IEEE Micro 16 (3), June 1996, pages 26-33, in which the authors discuss several Montgomery multiplication algorithms and analyze in detail the space and time requirements for the described methods.

In "Modified Montgomery modular multiplication and RSA exponentiation techniques," IEE Proceedings on Computation Digital Techniques, Vol. 151, No. 6, November 2004, McIvor et al., present a modified Montgomery multiplication and associated Rivest-Shamir-Adleman (RSA) modular exponentiation algorithms and circuit architectures that use carry save adders (CSAs) to perform large word length additions. The presented approach is based on a reformulation of the solution to modular multiplication within the context of RSA exponentiation, and presents two algorithmic variants, one based on a five-to-two CSA and the other on a four-to-two CSA plus multiplexer.

SUMMARY OF THE INVENTION

An embodiment of the present invention that is described herein provides a Montgomery multiplication apparatus (MMA) for multiplying two multiplicands modulo a predefined number. The MMA includes a pre-compute circuit and a Montgomery multiplication circuit. The pre-compute circuit is configured to compute a Montgomery pre-compute value by performing a series of iterations. In a given iteration, the pre-compute circuit is configured to modify one or more intermediate values by performing bit-wise operations on the intermediate values calculated in a preceding iteration. The Montgomery multiplication circuit is configured to multiply the two multiplicands, modulo the predefined number, by performing a plurality of Montgomery reduction operations using the Montgomery pre-compute value computed by the pre-compute circuit.

In some embodiments, the Montgomery pre-compute value is at least two to the power of twice the number of bits of the Montgomery multiplicands.

In some embodiments, the pre-compute circuit is configured, in the given iteration, to modify a bit-wise-sum and a bit-wise-carry by performing bit-wise-sum and bit-wise carry operations on (i) the bit-wise sum calculated in the preceding iteration, (ii) twice the bit-wise carry calculated in the preceding iteration, and (iii) a modulo-correction number. In an example embodiment, the pre-compute circuit is configured to calculate the Montgomery pre-compute value based on the sum of the bit-wise-sum and twice the bit-wise carry after a last iteration of the series of iterations. In another embodiment, the pre-compute circuit is configured to calculate the modulo-correction number based on the sum of the bit-wise sum and twice the bit-wise carry calculated in a last iteration.

In yet another embodiment, the pre-compute circuit is configured to calculate the modulo-correction number in the given iteration based on a difference between the sum of the bit-wise sum and the bit-wise carry calculated in the preceding iteration, and the predefined number. In still another embodiment, the pre-compute circuit is configured to calculate the modulo-correction number in the given iteration based on a subset of most significant bits of the sum of the bit-wise carry and the bit-wise sum calculated in the preceding iteration, and to a subset of the most significant bits of the predefined number.

In a disclosed embodiment, the pre-compute circuit is configured to calculate the modulo-correction number in the given iteration based on a subset of bits of the sum of the bit-wise carry and the bit-wise sum calculated in the preceding iteration, and on a subset of the bits of the predefined number. In an embodiment, the pre-compute circuit is configured to set the modulo-correction number to the predefined number multiplied by −1, −2 or 0. In an embodiment, the pre-compute circuit comprises a carry-save-adder (CSA), which is configured to compute, in the given iteration, a bit-wise sum and a bit-wise carry of (i) twice the bit-wise sum calculated in the preceding iteration, (ii) twice the bit-wise carry calculated in the preceding iteration, and (iii) a modulo-correction number set to the predefined number multiplied by −1, −2 or 0.

In some embodiments, the pre-compute circuit includes a three-input carry-save-adder (CSA), which is configured to compute, in the given iteration, a bit-wise sum and a bit-wise carry of (i) twice the bit-wise sum calculated in the preceding iteration, (ii) twice the bit-wise carry calculated in the preceding iteration, and (iii) a modulo-correction number set to the predefined number multiplied by −1, −2 or 0. In other embodiments, the pre-compute circuit includes a four-input carry-save-adder (CSA), which is configured to compute, in the given iteration, a bit-wise sum and a bit-wise carry of (i) twice the bit-wise sum calculated in the preceding iteration, (ii) twice the bit wise carry calculated in the preceding iteration, (iii) a first modulo-correction number set to the predefined number multiplied by −1 or 0, and (iv) a second modulo-correction number set to the predefined number multiplied by −2 or 0.

In some embodiments, the pre-compute circuit and the Montgomery multiplication circuit are included in a network device and configured to perform a cryptographic operation of the network device.

There is additionally provided, in accordance with an embodiment of the present invention, a method for multiplying two multiplicands modulo a predefined number. The method includes, using a pre-compute circuit, computing a Montgomery pre-compute value by performing a series of iterations including, in a given iteration, modifying one or more intermediate values by performing bit-wise operations on the intermediate values calculated in a preceding iteration. Using a Montgomery multiplication circuit, the two multiplicands are multiplied, modulo the predefined number, by performing a plurality of Montgomery reduction operations using the Montgomery pre-compute value computed by the pre-compute circuit.

There is further provided, in accordance with an embodiment of the present invention, an Integrated Montgomery Calculation Engine (IMCE) for multiplying two multiplicands modulo a predefined number. The IMCE includes a Carry Save Adder (CSA) circuit and control circuitry. The CSA circuit has multiple inputs, and has outputs including a sum output and a carry output. The control circuitry is coupled to the inputs and the outputs of the CSA circuit and is configured to operate the CSA circuit in at least (i) a first setting that calculates a Montgomery precompute value and (ii) a second setting that calculates a Montgomery multiplication of the two multiplicands.

In some embodiments, the control circuitry configured to logically shift the sum output and the carry output of the CSA circuit, and to couple the shifted sum output and the shifted carry output to respective inputs of the CSA circuit. In an example embodiment, the control circuitry is configured to logically shift-left the sum output and the carry output of the CSA circuit in the first setting, and to logically shift-right the sum output and the carry output of the CSA circuit in the second setting.

In an embodiment, in the first setting, the control circuitry is configured to set two of the inputs of the CSA circuit to a constant value that depends on the predefined number. In another embodiment, in the first setting, the control circuitry is configured to set an input of the CSA circuit to the predefined number or to zero, depending on most significant bits of the sum output and the carry output of the CSA circuit and on the two multiplicands. In yet another embodiment, in the second setting, the control circuitry is configured to set an input of the CSA circuit to zero or to one of the multiplicands, depending on the other of the multiplicands. In a disclosed embodiment, in the second setting, the control circuitry is configured to set an input of the CSA circuit to zero or to the predefined number, depending on least significant bits of the sum output, the carry output and the two multiplicands.

In some embodiments, the control circuitry is configured to further operate the CSA circuit in a third setting that calculates an exponentiation of a predefined base by a predefined exponent, modulo the predefined number. In an embodiment, the control circuitry is configured to operate the CSA circuit in the third setting by applying the first setting and the second setting in a sequence that is defined according to the exponent.

In some embodiments, the CSA and the control circuitry are included in a network device and configured to perform a cryptographic operation of the network device.

There is also provided, in accordance with an embodiment of the present invention, a method for multiplying two multiplicands modulo a predefined number. The method includes operating a Carry Save Adder (CSA) circuit, having multiple inputs, and having outputs comprising a sum output and a carry output. Using control circuitry that is coupled to the inputs and the outputs of the CSA circuit, the CSA circuit is controlled to operate in at least (i) a first setting that calculates a Montgomery precompute value and (ii) a second setting that calculates a Montgomery multiplication of the two multiplicands.

The present invention will be more fully understood from the following detailed description of the embodiments thereof, taken together with the drawings in which:

DETAILED DESCRIPTION OF EMBODIMENTS

Overview

Public-key cryptosystems may be used to provide data confidentiality, author authentication and data integrity. Some public-key cryptosystems (e.g., Rivest-Shamir-Adleman (RSA)) rely on modular exponentiation of large numbers, which requires repeated modular multiplications. To increase security, the operand sizes are typically well over 1000 bits in length, which increases the computation load of the exponentiation operation.

A typical algorithm that used to reduce the computation load of modular multiplications is the Montgomery algorithm (described, for example, in the Kork et al. article cited above). The Montgomery multiplication algorithm replaces trial division by the modulus with a series of additions and divisions by a power of two and is today the most common algorithm used in RSA cryptosystems.

The Montgomery algorithm may be implemented in hardware or software. Typically, hardware implementations are based on repetitive operations, which are preceded by pre-computing one or more values, and may be followed by a carry-propagate operation and by a final modulo correction. The precompute value may be, for example $(2^{2n})$ % R, where n is the number of bits of the Montgomery operands, "%" denotes a modulo operation, and R, the divisor, is a preselected number ($R<2^n$).

Embodiments of the present invention that are described herein provide efficient methods and apparatuses for the calculation of the Montgomery precompute values. In some disclosed embodiments, a Montgomery multiplication apparatus (MMA) is configured to multiply two multiplicands modulo a predefined number. In some embodiments, the MMA comprises a pre-compute circuit and a Montgomery multiplication circuit. The pre-compute circuit is configured to compute a Montgomery pre-compute value by performing a series of iterations. In a given iteration, the pre-compute circuit modifies one or more intermediate values by performing bit-wise operations on the intermediate values calculated in a preceding iteration. In an embodiment, in a given iteration, the pre-compute circuit modifies a bit-wise-sum and a bit-wise-carry by performing bit-wise-sum and bit-wise carry operations on (i) the bit-wise sum calculated in the preceding iteration, (ii) twice the bit-wise carry calculated in the preceding iteration, and (iii) a modulo-correction number. The Montgomery multiplication circuit is configured to multiply the two multiplicands, modulo the divisor, by performing a plurality of Montgomery reduction operations using the Montgomery pre-compute value computed by the pre-compute circuit.

In some embodiments, two more bits are added to the operands of the precompute and/or the Montgomery multiplication, in order to avoid a final modulo correction step; thus for 4096-bit arithmetic, 4098-bit operands are used. Adding two bits also prevents overflow of intermediate values.

Other embodiments according to the present invention that are presented herein, provide for an Integrated Montgomery Calculation. Engine (IMCE), in which the precompute circuit is embedded in the Montgomery multiplication circuit; in an embodiment, the same bit-wise-sum and bit-wise-carry circuits are used during both precompute and Montgomery multiplication.

In some embodiments, the IMCE comprises a CSA and control circuitry. The control circuitry is configured to govern the operation of the CSA in a plurality of settings; in a first setting, the control circuitry controls the CSA to perform a Montgomery Precompute calculation; in a second setting, the control circuitry controls the CSA to perform a Montgomery multiplication, and, in a third setting, the control circuitry controls the CSA to calculate a modulo exponentiation, using a sequence of Montgomery Multiplications. In embodiments, the control circuitry comprises a first circuit that is configured to control loop-back inputs of the CSA, and a second circuit that may configure the CSA (through the first circuit) to calculate a modulo exponentiation.

In the example embodiments that are described hereinbelow, the number of bits of the Montgomery operand is 4098; the disclosed technique, however, is not limited to 4098 bits; any other suitable number of bits may be used in alternative embodiments.

The disclosed MMAs and IMCEs can be embedded in a variety of host systems and used in a variety of use-cases. Generally, any system involving Montgomery multiplication can benefit from the techniques described herein. Example host systems comprise various network devices such as network adapters (e.g., Ethernet Network Interface Controllers (NICs), Infiniband Host Channel Adapters (HCAs), Data Processing Units (DPUs) or "Smart-NiCs", network-enabled Graphics Processing Units (CPUs)), network switches and routers, and accelerators.

In one example use-case, a disclosed MMA and/or IMCE is embedded in a network device and used in a secure boot process of the network device, e.g., for authentication of signatures. In another example use-case, a disclosed MMA and/or INCH is embedded in a network adapter and used for accelerating cryptographic operations such as Public Key operations.

System Description

Figure 1:
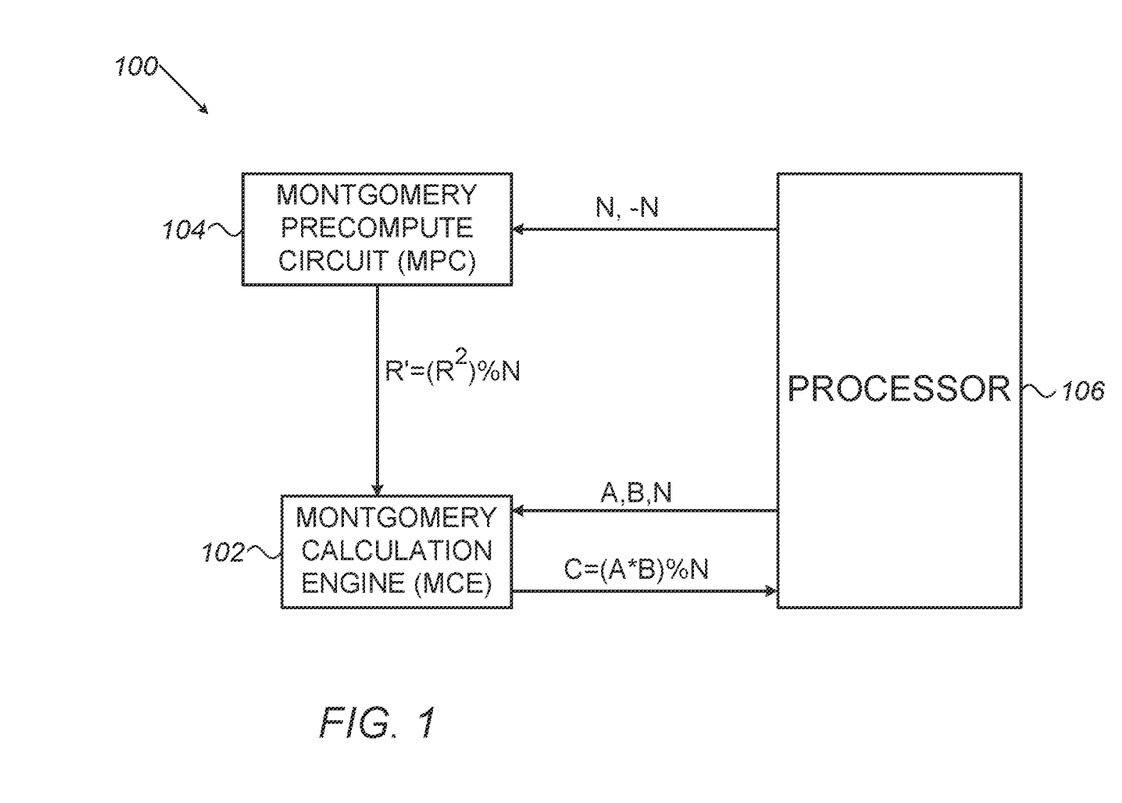
FIG. 1 is a block diagram that schematically illustrates a Montgomery Multiplication Apparatus (MMA), in accordance with an embodiment of the present invention.

FIG. 1 is a block diagram that schematically illustrates a Montgomery Multiplication Apparatus (MMA) 100, in accordance with an embodiment of the present invention. MMA 100 calculates the product of pairs of numbers modulo a large prime number N and comprises a Montgomery Calculation Engine (MCE) 102, a Montgomery Precompute unit (MPC) 104, and a processor 106. MCE 102 is also referred to herein as a Montgomery multiplication circuit. Depending on the applicable host system and use-case, processor 106 may comprise, or may be embedded in, for example, a CPU, a GPU, a System-on-Chip (SoC), a controller, a Digital Signal Processor (DSP), or any other suitable type of processor.

MCE 102 is configured to receive the multiplication arguments A, B and the divisor N from processor 106, and a precompute value $2^R$ % N from MPC 104 and output the product (A*B) % N to processor 106. MCE 102 may be a processor that executes a suitable software program, or a hardware Montgomery multiplier (see, for example, "Montgomery Multiplier for Faster Cryptosystems," by Thampi and Jose, Procedia Technology 25 (2016), pages 392-398). In some embodiments, MCE 102 comprises additional circuitry that calculates Montgomery-multiplication based exponents (see, for example, the McIvor et al. article cited above).

MPC 104 is configured to receive N and −N from processor 106. N and −N are typically represented in n+2 bits, where n is the number of bits that are used in the Montgomery multiplication (−N may be represented by "two's complement" representation: −N=~N+1 (N inverse+1)).

MPC 104 then calculates the precompute value $(2^{2n})$ % N and sends the result to MCE 102. In an embodiment, the MPC comprises a three or a four input. Carry-Save Adder (CSA), and completes the calculation in a number of cycles that is close to n–the number of bits.

Processor 106 is configured to send operands (multiplicands) to MCE 102 and MPC 104, and receive the multiplication result from MCE 102. In some embodiments, processor 106 may not be needed—for example, MPC 104 comprises a processor.

The configuration of MMA 100 is an example configuration that is depicted purely for the sake of conceptual clarity. Other suitable configurations may be used in alternative embodiments of the present invention. For example, in some embodiments, a single MPC is configured to precompute values for a plurality of MCEs. In another example, MPC 104 is configured to calculate −N by two's complementing N; and, thus, processor 106 does not send −N to the MPC 104.

In some embodiments, Processor 106 and/or MPC 104 comprise a general-purpose processor, which is programmed in software to carry out the functions described herein. The software may downloaded to the processor in electronic form, over a network or from a host, for example, or it may, alternatively or additionally, be provided and/or stored on non-transitory tangible media, such as magnetic, optical, or electronic memory.

Figure 2:
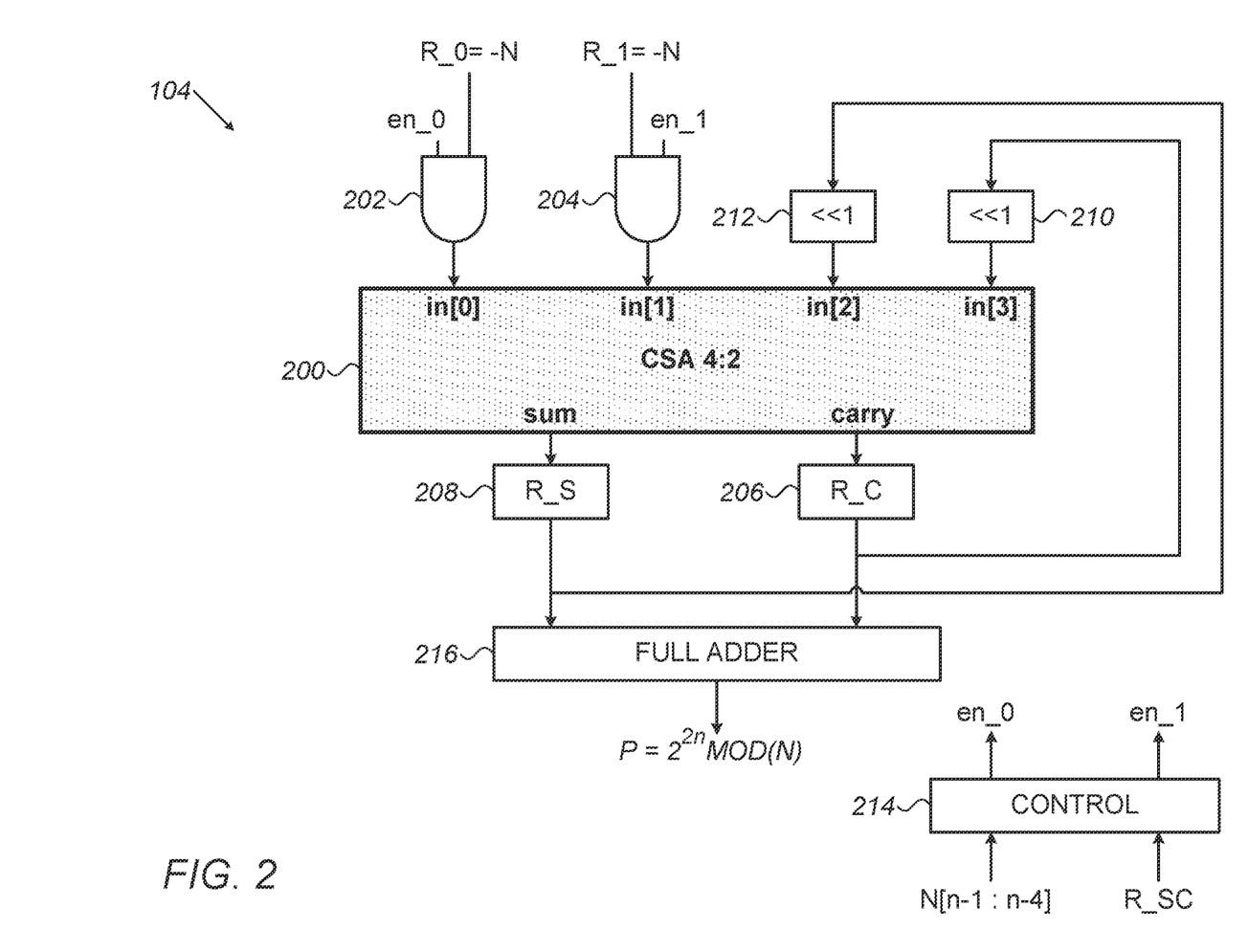
FIG. 2 is a block diagram that schematically illustrates a Montgomery Precompute Circuit (MPC) in the MMA of FIG. 1, in accordance with an embodiment of the present invention.

FIG. 2 is a block diagram that schematically illustrates Montgomery Precompute Circuit (MPC) 104, in accordance with an embodiment of the present invention. The MPC comprises a four input Carry-Save-Adder (CSA) 200, which is configured to sum four inputs (designated In[0] through In[3]). The value of −N (N is the modulo divisor) is input to the MPC (e.g., from processor 106, FIG. 1), and is applied to an R_0 input of an AND gate 202 and an R_1 input of an AND gate 204. AND gates 202 and 204 are configured to transfer the −N input to inputs in[0] and in[1] (respectively) of the CSA when enabled, and to transfer a value of 0 otherwise. (The enable inputs of AND gate 202 and 204 are referred to, respectively, as en_0 and en_1.)

It should be noted that when both en_0 and en_1 are off (e.g., at Logic-0), CSA 200 receives a combined value of 0 in input in[0] and in[1]; when one of en_0, en_1 is on, the CSA receives a combined value of −N, and when both en_0, en_1 are on, the CSA receives a combined value of −2N.

Two registers—an R_C register 206 and an R_S register 208—are configured to store, respectively, the carry and the sum outputs of CSA 200. The data stored in R_C 206 may be routed back, through a shifter 210, to the in [3] input of CSA 200, whereas the data stored in R_S 208 may be routed, through a shifter 212, to the in[2] input. Shifters 210 and 212 are configured to multiply by two by shifting data left by one position (the rightmost output bit is set to Logic-0).

MPC 104 further comprises a Control unit 214, which is configured to drive inputs en_0 and en_1 of AND gates 202 and 204. As will be described below (with reference to FIG. 3), in embodiments, only a few of the more significant bits (e.g., the five most significant bits) of N and R_SC are input to Control unit 214.

In an embodiment, the precomputing process carried out by MPC 104 comprises a carry-save phase in which CSA 200 generates a sum and carry representation of the precompute value, and a carry-propagate phase in which the sum and the carry (which are stored in R_S 208 and R_C 206, respectively) are added, to produce the precompute value $P=2^{2n} \% N$. According to the example embodiment illustrated in FIG. 2, MC 104 comprises a Full-Adder 216, which is configured to add the values stored in R_S 208 and R_C 206, so as to produce the precompute value P. In an example embodiment, Full-Adder 216 comprises 64 bits, and may perform a 4096-bit addition in 64 cycles (as will be described below, two more bits may be needed in the CSA, and, thus, Full-Adder 216 may need 65 cycles to carry out the 4098-bit addition).

In summary, MPC 104 computes $P=2^{2n} \% N$ in an iterative carry-save phase, followed by an iterative carry-propagate phase. In the carry-save phase, a 4-input CSA iteratively calculates P by carry-save adding a value of 0, −N or −2N, and the left-shifted carry and save results of the previous iteration. In the carry-propagate phase, a Full-Adder iteratively sums the carry and sum of the carry-save phase, to produce P.

As would be appreciated, the configuration of MPC 104 is an example configuration that is depicted purely for the sake of conceptual clarity. Other suitable configurations may be used in alternative embodiments of the present invention. For example, a three-input rather than a four-input CSA may be used, wherein AND gates 202, 204 are replaced by a multiplexor that is configured to output 0, −N or −2N to a single CSA input that replaces in[0] and in[1]. In an embodiment, shifters 210 and/or 212 may not be needed; instead, R_S and R_C may be wired to in[2] and in[3] in a shifted manner (e.g., R_S[0] wired to in[2][1], R_S[1] wired to in[2][2], etc.).

Saving a Final Subtraction Stage

According to the original Montgomery paper and early implementation thereof, a Montgomery multiplication is followed by a final step in which modulo correction to the result C is performed:

if $(C>N) C=C-N$.

This operation is relatively expensive since it requires full carry propagation. In addition, by externally measuring the number of Montgomery multiplication cycles, a hacker attempting to find the key may deduct whether a modulo correction was required, narrowing the scope of possible key values. However, in ac article by Walter, entitled "Montgomery exponentiation needs no final subtractions," Electronics Letters, 35 (21), 1999, the author teaches how the final modulo correction can be avoided if the number of bits in the Montgomery multiplication is increased by 2. The following table describes the differences between the original Montgomery algorithm and Walter's suggestion:

| | | width | | |
|---|---|---|---|---|
| parameter | value | Montgomery | Walter | description |
| n | 4,096 | | | Residue width = 4,096 |
| A | | [n − 1:0] | | |
| B | | [n − 1:0] | | |
| N | | [n − 1:0] | | Residue |
| R | $R = 2^{n+2}$ | [n:0] | [n + 2:0] | Boundary |
| R' | $R' = (R^2) \mathrm{mod}(N)$ | | [n − 1:0] | Pre-compute |
| loop | | n | n + 2 | |

Thus, in some embodiments, MPC 104 computes a precompute value in which the exponent is larger than 2n, for example computes $R=2^{2(n+2)}$.

Figure 3:
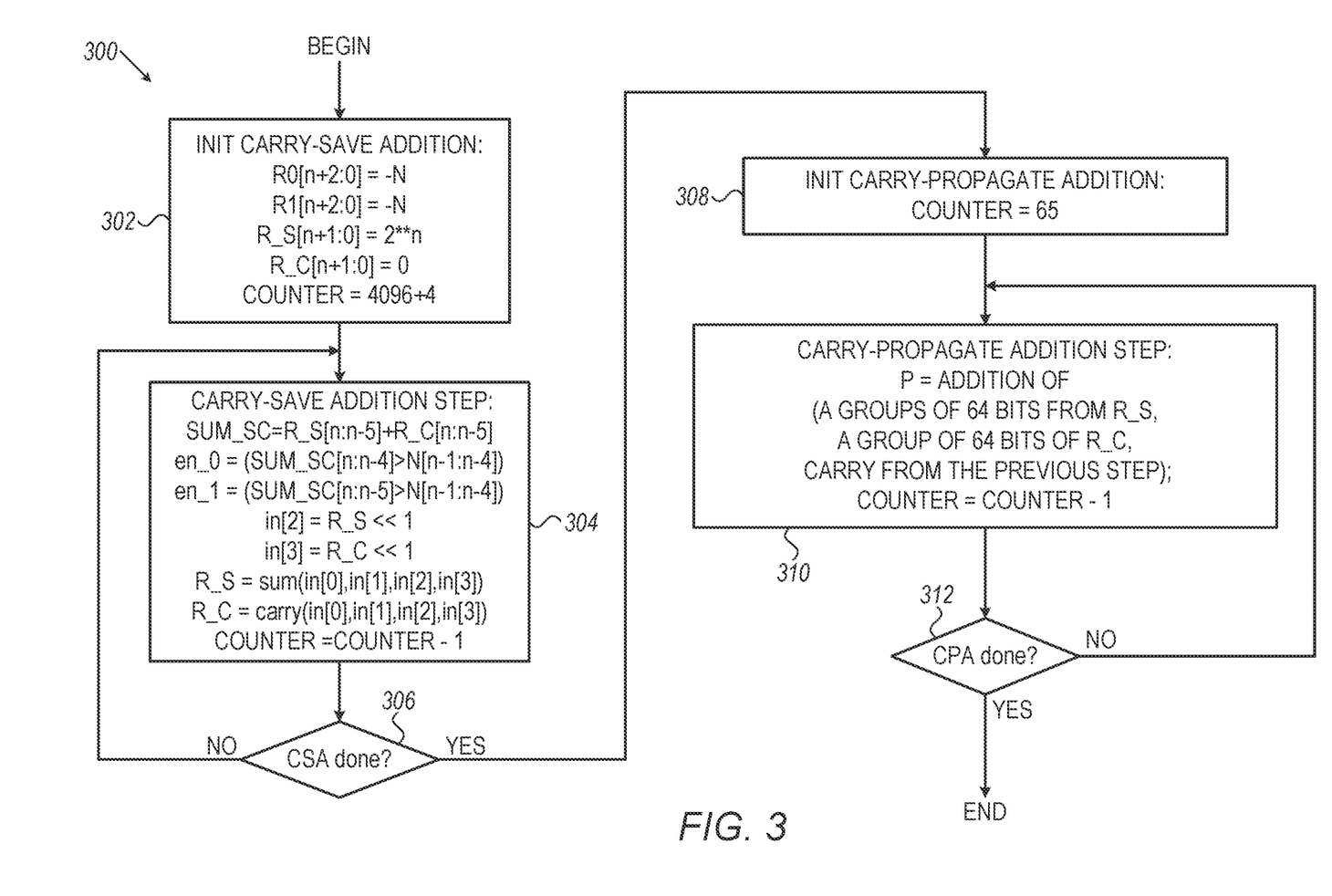
FIG. 3 is a flowchart that schematically illustrates a method for Montgomery precomputation, in accordance with an embodiment of the present invention.

FIG. 3 is a flowchart 300 that schematically illustrates a method for Montgomery precomputation, in accordance with an embodiment of the present invention. The flow is executed by MPC 104 (FIG. 1). The flowchart starts at an Initialize-Carry-Save-Addition step 302, wherein the MPC sets initial values to parameters that are stored in registers, including R_0, R_1, R_S, and R_C (all described above with reference to FIG. 2), and a Counter, which is configured to count iterations. Step 302 comprises: initialize R0 and R1 to an n±3-bit representation of −N; initialize R_S to an n+1 -bit representation of $2^n$, initialize R_C to an N+1 bit representation of 0, and initialize the counter to 4096+4.

The MPC then enters a Carry-Save-Addition step 304, wherein the MPC: i) sets en_0 to 1 if the number represented by the five most-significant bits of is greater than the number represented by the five most-significant bits of N (en_0=1 will output −N to in[0], whereas en_0=0 will output 0); ii) sets en_1 to 1 if the number represented by the six most-significant bits of S_N is greater than the number represented by the five most-significant bits of N (en_1=1 will output −N to in[1], whereas en_1=0 will output 0); iii) asserts the value of R_S shifted left by 1 in in[2]; iv) asserts the value of R_C shifted left by 1 in in[3]; v) sets R_S equal to the sum (without carry) of in[0], in[1], in[2] and in[3]; vi) sets R_C equal to the carry of in[0], in[1], in[2] and in[3]; and, vii) decrements the counter.

(Carry-Save-Addition step 304 is mathematically defined by the following equations:

$$SUM\_SC[5:0]=R\_S[n:n-4]+R\_C[n:n-4]$$

$$en\_0=(N[4095:4095-3]<SUM\_SC[5:0]);$$

$$in0=(en\_0)?-4096: 0$$

$$en\_1=(N[4095:4095-3]<SUM\_SC[5:1]);$$

$$in1=(en\_1)?-4096: 0$$

$$in2=R\_S<<1$$

$$in3=R\_C<<1$$

$$R\_C, R\_S=CSA(in0, in1, in2, in3)$$

$$counter=counter-1.)$$

After step 304, the MFC enters a Check-CSA-Done step 306 and checks if the counter has reached the value of zero. If so, the carry-save-addition phase is over; the sum and the carry of the precomputed value $P=2^2n \% N$ are stored in R_S and R_C, respectively, and the MPC will then enter an Initialize Carry-Propagate-Addition step 308. If, in step 306, carry-save-addition is not done, the MPC will reenter step 304, to execute the next CSA iteration.

In step 308, the MPC initializes the counter to 65. According to the example embodiment illustrated in FIG. 3, Full-Adder 216 (FIG. 2) comprises 64 bits; hence, the carry-propagate addition takes 64+1 iterations (64*64=4096; an extra iteration is needed since n is slightly larger than 4096).

After step 308 the MPC enters a Carry-Propagate-Addition step 310, wherein the output P is calculated (by adding the carry from the previous iteration, a 64-bit group form R_S and a 64-bit group from R_C) and the counter is decremented. The selected groups of bits from R_S and R_C are shifted to the left in successive iteration (e.g., bits 63:0 are selected in the first iteration, bits 127:64 in the next iteration, etc.).

Next, the MPC enters a Check-Carry-Propagation-Addition-Done ((PA-done) step 312 and checks if the counter has reached the value of zero. If so, the precompute flowchart is done, and the precompute value is stored in P. If, in step 312, Carry-Propagation Addition is not done, the MPC reenters step 310, for the next CPA iteration.

As would be appreciated, flowchart 300 illustrated in FIG. 3 is an example that is depicted purely for the sake of conceptual clarity. Other suitable flowcharts may be used in alternative embodiments of the present invention. For example, the counter may count-up rather than down (with the check-done steps modified accordingly). In some embodiments the counter may be incremented (or decremented) after the check-done steps.

Precomputing Small Numbers

In some embodiments, the number of bits for the precompute operation may be smaller than the width of the MPC (e.g., N<4096). As, in the methods and circuits described above, a next cycle is executed responsively to the higher order bits of the operand, two preliminary steps are added:
  a. The operand is shifted-left (by the MPC, the MCE or by a processor) until the MSB=1;
  b. The number of algorithm cycles is decreased by the shift count of a).

After the precompute algorithm is done, the result is shifted right (by the MPC, the MCE or by a processor) to revert the original bit size.

Integrated Montgomery Multiplier with Precompute Circuit

The precompute circuit described above is similar to the Montgomery multiplication circuit. In some embodiments, the precompute is integrated within the Montgomery multiplication circuit, adding a small amount of logic.

Figure 4:
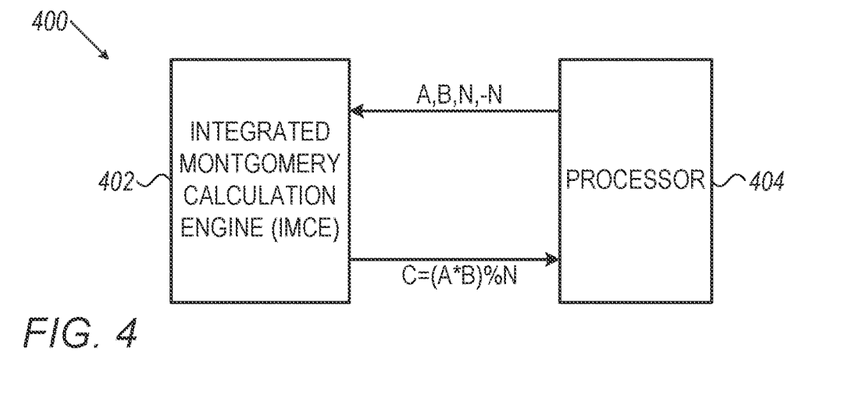
FIG. 4 is a block diagram that schematically illustrates an MMA with a precompute circuit integrated in the Montgomery Calculation Engine, in accordance with an embodiment of the present invention.

FIG. 4 is a block diagram that schematically illustrates an MMA 400 with a precompute circuit integrated in the Montgomery Calculation Engine, in accordance with an embodiment of the present invention. Like MMA 100 (FIG. 1), MMA 400 calculates the product of pairs of numbers modulo a large prime number N, but, unlike MMA 100, MMA 400 comprises an Integrated Montgomery Calculation Engine (IMCE) 402, which is configured to receive arguments A, B and the divisor N from a processor 404, and to output the product (A*B) % N to the processor 404. Processor 404 is configured to send operands (multiplicands) to IMCE 402 and receive the multiplication result from the IMCE. In some embodiments, processor 404 may not be needed—for example, if IMCE 402 comprises a processor.

Like in MMA 100, in some embodiments, Processor 404 and/or IMCE 402 comprise a general-purpose processor, which is programmed in software to carry out the functions described herein. The software may be downloaded to the processor in electronic form, over a network or from a host, for example, or it may, alternatively or additionally, be provided and/or stored on non-transitory tangible media, such as magnetic, optical, or electronic memory.

Figure 5:
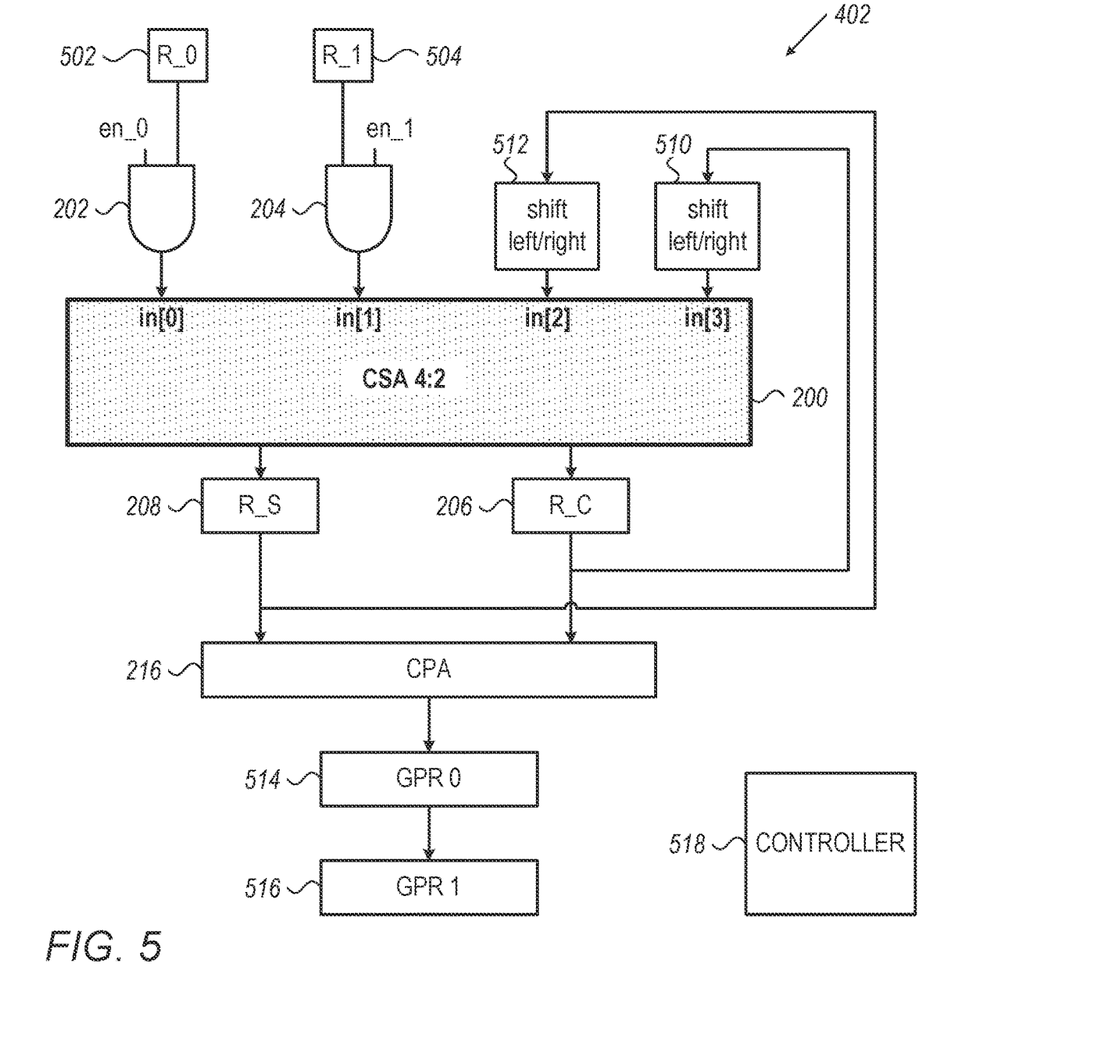
FIG. 5 is a block diagram that schematically illustrates an Integrated Montgomery Calculation Engine (IMCE), in accordance with an embodiment of the present invention.

FIG. 5 is a block diagram that schematically illustrates an integrated Montgomery Calculation Engine (IMCE) 402, in accordance with an embodiment of the present invention. In the example embodiment, the multiplication is 4096-bit× 4096-bit (however, as explained in the Walter reference cited above, we use 4096+2=4098 bits to save a last modulo operation). As would be appreciated, ICME 402 is a superset of MPC 104 (FIG. 2); some of the subunits of ICME 402 are identical to counterparts of MPC 104 (and retain the same sub-unit numbers; other subunits are supersets of corresponding MPC 104 subunits. In addition, IMCE 402 comprises three new subunits—a Controller 518 (which is different from Control Unit 214, FIG. 2), and two registers—a GPR0 register 514 and a GPR1 register 516.

4-input CSA 200 carry-save adds inputs IN[0] through IN[3]. The sum and carry outputs are coupled, respectively, to an R_S register 208 and to an R_C register 206. Inputs IN[0] and IN[1] are coupled to AND gates 202, 204, respectively. AND gate 202 is configured to output to IN[0] the value of an R_0 register 502 when an signal en_0 is at logic-1 and zero otherwise, whereas AND gate 204 is configured to output to IN[1] the value of an R_1 register 504 when a signal en_1 is at logic-1 and zero otherwise.

A left/right shifter 512 is configured to shift the output of R_S 208 left or right, and send the shifter value to IN[2] of CSA 200; in a similar manner, A left/right shifter 510 is configured to shift the output of R_C 206 left or right, and send the shifter value to IN[3] of CSA 200. As would be appreciated, left/right shifters 512 and 510 are superset of shifters 212, 210 (FIG. 2), which are configured to shift-left only. In some embodiments, CPA 216 carry-propagate adds groups of bits (e.g., 64-bit groups) from R_S 208 and R_C 206 to reduce the 4098-bit carry-sum representation to a 4098 bit binary representation; in an embodiment, GPPR0 514 and/or GPR1 516 sequentially load the output of CPA 216, e.g., in groups of 64 bits.

Controller 518 configured to govern the operation of IMCP 402 by sending a sequenced pattern of control signals to the subunits, including en_0, en_1; shift-direction control of left/right shifters 512 and 510; load control of registers R_0 502, R_1 504, GPR0 514, GPR1 516; and by initializing the control of registers R_S 208, R_C 206. The controller may be configured (e.g., by processor 404, FIG. 4) to one of at least two settings—a first setting in which the controller governs AND gates 202, 204 and Shifters 510, 512 so that the CSA will calculate a Montgomery precompute value, and a second setting in which the controller governs the AND gates and the Shifters so that the CSA will calculate a Montgomery multiplication. In some embodiments the controller may be configured to a third setting, in which the CSA calculates exponentiation (e.g. RSA exponentiation) by cascading a Montgomery precompute setting and multiple occurrences of Montgomery multiplication settings.

We will refer hereinbelow to the aggregation of Controller 518, AND gate 202, AND gate 204, shifter 510 and shifter 512, collectively, as Control Circuitry.

Thus, according to the example embodiment illustrated in FIG. 5 and described hereinabove, IMCE 402 is configured to perform both Montgomery precompute calculation and Montgomery multiplication (and, particularly, a Montgomery precompute followed by Montgomery multiplication.

As would be appreciated, the configuration of IMCE 104 illustrated in FIG. 5 and described hereinabove is an example configuration that is depicted purely for the sake of conceptual clarity. Other suitable configurations may be used in alternative embodiments of the present invention. For example, in some embodiments there is no CPA, and all operations are done in a sum and carry notation (except for the final exponentiation result, which may converted to binary format by a CPA or, for example, by software).

Figure 6:
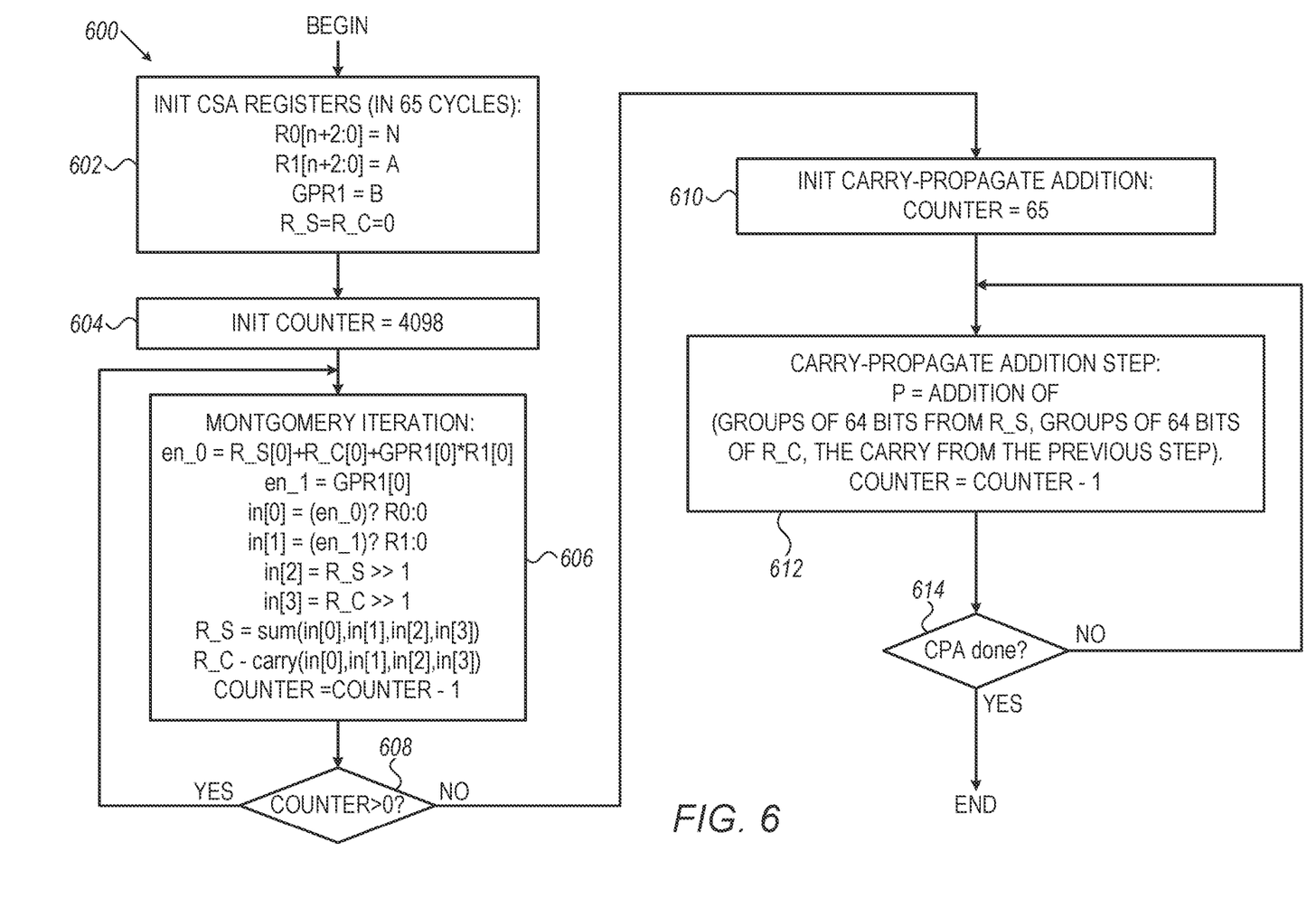
FIG. 6 is a flowchart that schematically illustrated a method for Montgomery 4096-bit×4096-bit multiplication, in accordance with an embodiment of the present invention.

FIG. 6 is a flowchart 600 that schematically illustrated a method for Montgomery 4096-bit×4096-bit multiplication, in accordance with an embodiment of the present invention. In the example embodiment illustrated in FIG. 6, the two multiplicands are expanded to 4098-bit, to save a final modulo stage (as explained above). The flow is executed by Control circuit 518, which controls the various subunits of IMCE 402 (FIG. 5). The flowchart starts at an Initialize-CSA-Registers step 602, wherein the control circuit loads a value of N (the modulo) to R0 502, loads a value of A (a first multiplicand) to R1 504; loads B (the second multiplicand) to GPR1 514, and loads zero to R_S 208 and R_C 206 registers. In an embodiment, the controller loads the 4098-bit values in groups of 64 bits, over 65 cycles. In some embodiments, the controller receives some or all the values from a processor (e.g., processor 404, FIG. 4), directly or over a bus.

Next, the control circuit enters an Initialize-Counter step 604 and loads an internal counter (not shown) with the value of 4098—the number of Montgomery Reduction iterations to be executed. The control circuit then enters a Montgomery Iteration step 606 wherein the control circuit:

i) sets the en0 input of AND gate 202 (FIG. 402) to S[0]+C[0]*GPR1[0]*r1[0] (bit operations);
ii) sets the en1 input of AND gate 204 to GTR1[0];
iii) if en_0 is at logic-1—copy R0 to the 4098 bit in[0]; otherwise—set in[0]=0;
iv) if en_1 is at logic-1—copy R1 to the 4098 bit in [1]; otherwise—set in[1]=0;
v) sets the 4098-bit in [2] value to a shift-right-by-1 of R_S;
vi) sets the 4098-bit in[3] value to a shift-right-by-1 of R_C;
vii) bit-wise adds in[0], in[1], in[2], in[3] (saving the bit-wise sum in R_S and the bit-wise carry in R_C); and,
viii) decrements the counter.

The control circuit then enters a Check-Counter-Greater-Than-Zero step 608 and checks if the counter value is still greater than zero. If so, the Montgomery Multiplication loop is not yet done, and the control circuit reenters step 606 to execute the next Montgomery iteration. If, in step 608, the counter is not grater than zero, the control circuit will enter an Init-Carry-Propagate-Addition step 610 wherein the control circuit sets the counter to 65, and then enters a Carry-Propagate-Addition (CPA) step 612.

CPA step 612 (like step 310 in FIG. 3) is a 64-bit addition which adds a group of 64 R_S bits to a corresponding group of 64 R_C bits and decrements the counter. In a Check-CPA-Done step 614 the control circuit checks if the counter has reached zero, and reenters step 612 if the counter is still greater than zero. the control circuit loops through steps 612 and 614 65 times to accumulate all 4098 carry-save bit-pairs. When, in step 614, the counter has reached zero, the flowchart ends.

As would be appreciated, flowchart 600 illustrated in FIG. 6 and described hereinabove is an example that is depicted purely for the sake of conceptual clarity. Other suitable flowcharts may be used in alternative embodiments of the present invention. For example, in embodiments, the counter may count-up and then compared to the number of iterations. In some embodiments the counter is modified after it is checked for completion.

RSA Exponent Calculation

RSA algorithm comprises modulo exponentiations of large numbers. In the McIvor et al. article cited above the authors describe using a Montgomery multiplier for the exponentiation. The exponentiation is formally defined as $M=C^D \mod(n)$. D—the exponent, may be stored in Control Circuit 518, or read from a processor (e.g., processor 204, FIG. 4).

Figure 7:
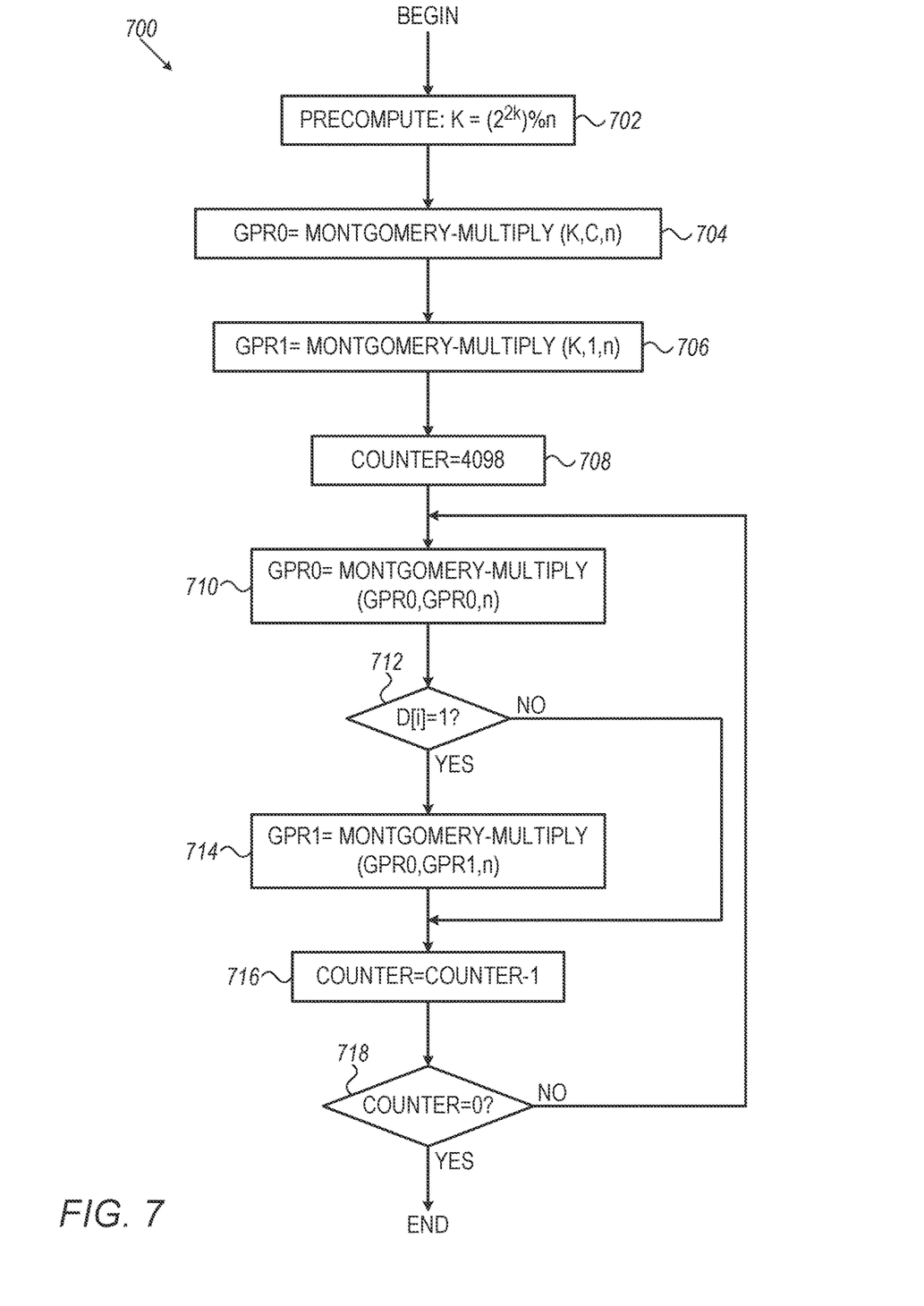
FIG. 7 is a flowchart that schematically illustrates a method for modulo exponentiation, in accordance with an embodiment of the present invention.

FIG. 7 is a flowchart 700 that schematically illustrates a method for modulo exponentiation, in accordance with an embodiment of the present invention. The flowchart is executed by control circuit 518 (FIG. 5). The exponentiation flowchart comprises execution of precompute flowchart 300 (FIG. 3) and multiple executions of Montgomery Multiplication flowcharts 600 (FIG. 6). We will formally refer hereinbelow to Montgomery Precompute, which computes $K=(2^{2k}) \% n$ as Precompute(k,n); and to a Montgomery Multiplication $M=(a*b) \% n$ as MONTGOMERY(a,b,n).

Flowchart 700 starts at a Precompute step 702, wherein the control circuit calculates a precompute value K=PRECOMPUTE(k,n) by executing a precompute flow, e.g., flowchart 300 (FIG. 3). Next, the control circuit, in a Calculate-Initial-GPR0 step 704, executes a Montgomery Multiplication flow (e.g., flow 600, FIG. 6) to calculate MONTGOMERY (K,C,n) and stores the result in GPR0. Then, in a Calculate-Initial-GPR1 step 706, the control circuit executes another Montgomery Multiplication flow to calculate MONTGOMERY (K, 1, n) and stores the result in GPR1. The control circuit now, in a Set-Counter-4098, sets the value of the counter to 4098—the number of iterations the exponentiation.

After step 708, the control circuit starts the sequence of 4098 exponentiation iterations. GPR0 will store, after the $i^{th}$ iteration, the value of $C^{2i}$, whereas GPR1 will store the accumulated exponentiation result for $C^{D[i-1:0]}$. In a Calculate-Next-GPR0 step 710, the control circuit computes MONTGOMERY(GPR0,GPR0,n), squaring the previous value of GPR0. Next, in a Check-Di step 612, the control circuit checks if the $i^{th}$ bit of d is logic-1. If so, the control circuit will enter an Update-GPR1 step 714, wherein the control circuit will execute a Montgomery Multiplication (e.g., flowchart 600) to calculate MONTGOMERY(GPR0, GPR1,n), stores the result in GPR1 and proceeds to a Decrement Counter step 716 (if, in step 712, d[i] is not logic-1, the control circuit bypasses step 714).

In step 716 the control circuit decrements the counter and then, in a Check-Counter-0 step 718, checks if the counter has reached 0. If so, the exponentiation flow ends and GPR1 stores M—the exponentiation result. If, in step 718, the counter has not reached 0, the control circuit reenters step 710, for the next exponentiation iteration.

As would be appreciated, flowchart 700 illustrated in FIG. 7 and described hereinabove is an example that is depicted purely for the sake of conceptual clarity. Other suitable flowcharts may be used in alternative embodiments of the present invention. For example, in embodiments, to protect against security attacks that measure the exponentiation time to estimate the number of logic-1 exponent bits, the Montgomery-multiplication of step 714 is always executed and the value of bit d[i] of the exponent (that is checked in step 712) determines if GPR1 will be updated with the multiplication results. In some embodiments, the counter clears in step 708, counts-up in step 716 and compared to 4098 in step 718. In an embodiment the counter increments after being compared to the terminal value.

Montgomery Calculation of Small Numbers

In the Montgomery Multiplication methods and circuits described above, a next cycle is executed responsively to the low order bit of the operand and, therefore, the algorithm works well with when the number of bits of the numbers to be multiplied is smaller than the width of the IMCE (e.g., N<4096). The operands should be loaded to the LSB parts of the registers, and logic-0 bits should be loaded to the unused MS part.

The configurations of Montgomery Multiplication Apparatuses (MMA) 100 and 400, including Montgomery Precompute Circuit (MPC) 104 and Integrated Montgomery Calculation Engine (IMCE) 402, the methods of flowchart 300, 600 and 700 which are described hereinabove, are example configurations and methods that are shown purely for the sake of conceptual clarity. Any other suitable configurations and flowcharts can be used in alternative embodiments. The different elements of Montgomery Multiplication Apparatuses (MMA) 100 and 400, including Montgomery Precompute Circuit 104 and integrated Montgomery Calculation Engine 402, may be implemented using suitable hardware, such as in one or more Application-Specific Integrated Circuits (ASICs) or Field-Programmable Gate Arrays (FPGAs).

Although the embodiments described herein mainly refer to the Montgomery multiplication, Montgomery precompute and Montgomery-based exponentiation, the methods and systems described herein can also be used in other applications, such as fast division.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Integrated Montgomery Calculation Engine (IMCE) for multiplying two multiplicands modulo a predefined number, the IMCE comprising:
   a Carry Save Adder (CSA) circuit, having multiple inputs, and having outputs comprising a sum output and a carry output; and
   control circuitry, which is coupled to the inputs and the outputs of the CSA circuit and which is to operate the CSA circuit in at least (i) a first setting that calculates a Montgomery precompute value and (ii) a second setting that calculates a Montgomery multiplication of the two multiplicands,
   wherein the control circuitry is to logically shift-left the sum output and the carry output of the CSA circuit in the first setting, to logically shift-right the sum output and the carry output of the CSA circuit in the second setting, and to couple the shifted sum output and the shifted carry output to respective inputs of the CSA circuit.

2. The IMCE according to claim 1, wherein the CSA and the control circuitry are comprised in a network device and are to perform a cryptographic operation of the network device.

3. An Integrated Montgomery Calculation Engine (IMCE) for multiplying two multiplicands modulo a predefined number, the IMCE comprising:
   a Carry Save Adder (CSA) circuit, having multiple inputs, and having outputs comprising a sum output and a carry output; and
   control circuitry, which is coupled to the inputs and the outputs of the CSA circuit and which is to operate the CSA circuit in at least (i) a first setting that calculates a Montgomery precompute value and (ii) a second setting that calculates a Montgomery multiplication of the two multiplicands,
   wherein, in the first setting, the control circuitry is to set two of the inputs of the CSA circuit to a constant value that depends on the predefined number.

4. An Integrated Montgomery Calculation Engine (IMCE) for multiplying two multiplicands modulo a predefined number, the IMCE comprising:
   a Carry Save Adder (CSA) circuit, having multiple inputs, and having outputs comprising a sum output and a carry output; and
   control circuitry, which is coupled to the inputs and the outputs of the CSA circuit and which is to operate the CSA circuit in at least (i) a first setting that calculates a Montgomery precompute value and (ii) a second setting that calculates a Montgomery multiplication of the two multiplicands,
   wherein, in the first setting, the control circuitry is to set an input of the CSA circuit to the predefined number or to zero, depending on (i) most significant bits of the sum output of the CSA circuit, (ii) most significant bits of the carry output of the CSA circuit, and (iii) the two multiplicands.

5. An Integrated Montgomery Calculation Engine (IMCE) for multiplying two multiplicands modulo a predefined number, the IMCE comprising:
   a Carry Save Adder (CSA) circuit, having multiple inputs, and having outputs comprising a sum output and a carry output; and
   control circuitry, which is coupled to the inputs and the outputs of the CSA circuit and which is to operate the CSA circuit in at least (i) a first setting that calculates a Montgomery precompute value and (ii) a second setting that calculates a Montgomery multiplication of the two multiplicands, wherein, in the second setting, the control circuitry is to set an input of the CSA circuit to zero or to one of the multiplicands, depending on the other of the multiplicands.

6. An Integrated Montgomery Calculation Engine (IMCE) for multiplying two multiplicands modulo a predefined number, the IMCE comprising:

a Carry Save Adder (CSA) circuit, having multiple inputs, and having outputs comprising a sum output and a carry output; and control circuitry, which is coupled to the inputs and the outputs of the CSA circuit and which is to operate the CSA circuit in at least (i) a first setting that calculates a Montgomery precompute value and (ii) a second setting that calculates a Montgomery multiplication of the two multiplicands, wherein, in the second setting, the control circuitry is to set an input of the CSA circuit to zero or to the predefined number, depending on least significant bits of the sum output, the carry output and the two multiplicands.

7. An Integrated Montgomery Calculation Engine (IMCE) for multiplying two multiplicands modulo a predefined number, the IMCE comprising:

a Carry Save Adder (CSA) circuit, having multiple inputs, and having outputs comprising a sum output and a carry output; and control circuitry, which is coupled to the inputs and the outputs of the CSA circuit and which is to operate the CSA circuit in at least (i) a first setting that calculates a Montgomery precompute value and (ii) a second setting that calculates a Montgomery multiplication of the two multiplicands, wherein the control circuitry is to further operate the CSA circuit in a third setting, which calculates an exponentiation of a predefined base by a predefined exponent, modulo the predefined number, by applying the first setting and the second setting in a sequence that is defined according to the exponent.

8. A method for multiplying two multiplicands modulo a predefined number, the method comprising:

operating a Carry Save Adder (CSA) circuit, having multiple inputs, and having outputs comprising a sum output and a carry output; and using control circuitry that is coupled to the inputs and the outputs of the CSA circuit, controlling the CSA circuit to operate in at least (i) a first setting that calculates a Montgomery precompute value and (ii) a second setting that calculates a Montgomery multiplication of the two multiplicands, wherein controlling the CSA circuit comprises logically left-shifting the sum output and the carry output of the CSA circuit in the first setting, logically right-shifting the sum output and the carry output of the CSA circuit in the second setting, and coupling the shifted sum output and the shifted carry output to respective inputs of the CSA circuit.

9. The method according to claim 8, wherein operating and controlling the CSA are performed in a network device for performing a cryptographic operation of the network device.

10. A method for multiplying two multiplicands modulo a predefined number, the method comprising:

operating a Carry Save Adder (CSA) circuit, having multiple inputs, and having outputs comprising a sum output and a carry output; and using control circuitry that is coupled to the inputs and the outputs of the CSA circuit, controlling the CSA circuit to operate in at least (i) a first setting that calculates a Montgomery precompute value and (ii) a second setting that calculates a Montgomery multiplication of the two multiplicands, wherein controlling the CSA circuit comprises, in the first setting, setting two of the inputs of the CSA circuit to a constant value that depends on the predefined number.

11. A method for multiplying two multiplicands modulo a predefined number, the method comprising:

operating a Carry Save Adder (CSA) circuit, having multiple inputs, and having outputs comprising a sum output and a carry output; and using control circuitry that is coupled to the inputs and the outputs of the CSA circuit, controlling the CSA circuit to operate in at least (i) a first setting that calculates a Montgomery precompute value and (ii) a second setting that calculates a Montgomery multiplication of the two multiplicands, wherein controlling the CSA circuit comprises, in the first setting, setting an input of the CSA circuit to the predefined number or to zero, depending on (i) most significant bits of the sum output of the CSA circuit, (ii) most significant bits of the carry output of the CSA circuit, and (iii) the two multiplicands.

12. A method for multiplying two multiplicands modulo a predefined number, the method comprising:

operating a Carry Save Adder (CSA) circuit, having multiple inputs, and having outputs comprising a sum output and a carry output; and using control circuitry that is coupled to the inputs and the outputs of the CSA circuit, controlling the CSA circuit to operate in at least (i) a first setting that calculates a Montgomery precompute value and (ii) a second setting that calculates a Montgomery multiplication of the two multiplicands, wherein controlling the CSA circuit comprises, in the second setting, setting an input of the CSA circuit to zero or to one of the multiplicands, depending on the other of the multiplicands.

13. A method for multiplying two multiplicands modulo a predefined number, the method comprising:

operating a Carry Save Adder (CSA) circuit, having multiple inputs, and having outputs comprising a sum output and a carry output; and using control circuitry that is coupled to the inputs and the outputs of the CSA circuit, controlling the CSA circuit to operate in at least (i) a first setting that calculates a Montgomery precompute value and (ii) a second setting that calculates a Montgomery multiplication of the two multiplicands, wherein controlling the CSA circuit comprises, in the second setting, setting an input of the CSA circuit to zero or to the predefined number, depending on least significant bits of the sum output, the carry output and the two multiplicands.

14. A method for multiplying two multiplicands modulo a predefined number, the method comprising:

operating a Carry Save Adder (CSA) circuit, having multiple inputs, and having outputs comprising a sum output and a carry output; and using control circuitry that is coupled to the inputs and the outputs of the CSA circuit, controlling the CSA circuit to operate in at least (i) a first setting that calculates a Montgomery precompute value and (ii) a second setting that calculates a Montgomery multiplication of the two multiplicands, wherein controlling the CSA circuit comprises further operating the CSA circuit in a third setting, which calculates an exponentiation of a predefined base by a predefined exponent, modulo the predefined number, by applying the first setting and the second setting in a sequence that is defined according to the exponent.

\* \* \* \* \*